US006403257B1

(12) United States Patent
Christian et al.

(10) Patent No.: US 6,403,257 B1
(45) Date of Patent: Jun. 11, 2002

(54) MECHANOCHEMICAL SYNTHESIS OF LITHIATED MANGANESE DIOXIDE

(75) Inventors: Paul A. Christian, Norton, MA (US); Ou Mao, New Milford, CT (US)

(73) Assignee: The Gillette Company, Boston, MA (US)

(*) Notice: Subject to any disclaimer, the term of this patent is extended or adjusted under 35 U.S.C. 154(b) by 124 days.

(21) Appl. No.: 09/612,864

(22) Filed: Jul. 10, 2000

(51) Int. Cl.$^7$ .............................................. H01M 4/50
(52) U.S. Cl. ...................................... 429/224; 423/599
(58) Field of Search .......................... 429/224, 218.1; 423/593, 599

(56) References Cited

U.S. PATENT DOCUMENTS

| | | | |
|---|---|---|---|
| 4,133,856 A | | 1/1979 | Ikeda |
| 5,240,794 A | * | 8/1993 | Thackeray et al. .......... 423/599 |
| 5,700,442 A | * | 12/1997 | Bloch et al. ................ 423/599 |
| 5,911,920 A | * | 6/1999 | Hasezaki et al. ......... 252/518.1 |
| 5,939,043 A | * | 8/1999 | Yahagi ....................... 423/599 |
| 6,017,504 A | * | 1/2000 | Kaliaguine et al. ......... 423/263 |
| 6,337,157 B1 | * | 1/2002 | Shirakawa et al. .......... 423/599 |

OTHER PUBLICATIONS

Obrovac, M.N., Mao, O. and Dahn, J.R., Solid State Ionics, vol. 112 (1998), pp. 9–19, no month.
McCormick, P.G. and Froes, F.H., Journal of Metals, vol. 50 (Nov. 1998), pp. 61–65.
Kosovo, N.V., et al., Journal of Solid State Chemistry, vol. 146, (1999), pp. 184–188, no month.

* cited by examiner

Primary Examiner—Carol Chaney
(74) Attorney, Agent, or Firm—Barry D. Josephs; Paul I. Douglas; Thomas G. Krivulka

(57) ABSTRACT

The invention relates to an improved method for preparing a lithiated manganese dioxide having a stabilized γ-MnO$_2$-type crystal structure whereby an essentially dry mixture of manganese dioxide and a lithium salt is subjected to a mechanical activation process in the presence of milling media. The mechanical activation process serves to promote partial ion-exchange of protons present in the manganese dioxide crystal lattice and on the surface of the manganese dioxide particles by lithium cations. The formed lithium ion-exchanged intermediate product is heat-treated to form a lithiated manganese dioxide product having a γ-MnO$_2$-type crystal structure that can be advantageously included in the cathode of a lithium primary electrochemical cell.

49 Claims, 6 Drawing Sheets

MECHANOCHEMICAL SYNTHESIS OF LITHIATED MANGANESE DIOXIDE

FIELD OF THE INVENTION

This invention relates to a method for preparing a lithiated manganese dioxide having a stabilized $\gamma$-$MnO_2$-type crystal structure wherein a nominally dry mixture of a manganese dioxide powder and a lithium salt are mechanically activated prior to heat-treatment. The invention also relates to the application of said prepared lithiated manganese dioxide as an active cathode material in a primary lithium electrochemical cell.

BACKGROUND OF THE INVENTION

Manganese dioxides suitable for use in lithium primary cells include both chemically produced manganese dioxide known as "chemical manganese dioxide" or "CMD" and electrochemically produced manganese dioxide known as "electrolytic manganese dioxide" or "EMD". CMD can be produced economically and in high purity, for example, by the methods described by Welsh et al. in U.S. Pat. No. 2,956,860. Typically, EMD is manufactured commercially by the direct electrolysis of a bath containing manganese sulfate dissolved in a sulfuric acid solution. Manganese dioxide produced by electrodeposition typically has high purity and high density. Processes for the manufacture of EMD and representative properties are described in "Batteries", edited by Karl V. Kordesch, Marcel Dekker, Inc., New York, Vol. 1, 1974, pp.433–488.

Typically, EMD is composed of a "gamma($\gamma$)-$MnO_2$" phase having a complex crystal structure consisting of an irregular intergrowth of predominantly "ramsdellite"-type $MnO_2$ phase and a smaller portion of "pyrolusite" or beta ($\beta$)-$MnO_2$ phase as described by deWolfe (*Acta Crystallographica*, 12, 1959, pp.341–345) and by Burns and Burns (e.g., in "Structural Relationships Between the Manganese (IV) Oxides", *Manganese Dioxide Symposium*, 1, The Electrochemical Society, Cleveland, 1975, pp. 306–327), incorporated herein by reference. Disorder in the crystal lattice of the $\gamma$-$MnO_2$ phase can include various non-coherent lattice defects, for example, stacking faults, micro-twinning, $Mn^{+4}$ cation vacancies, $Mn^{+3}$ cations from reduction of $Mn^{+4}$ cations, inserted protons (i.e., hydrogen ions), lattice distortions introduced by the presence of $Mn^{+3}$ cations (i.e., Jahn-Teller effect) as well as compositional non-stoichiometry as described, for example, by Chabré and Pannetier (*Prog. Solid State Chem.*, Vol. 23, 1995, pp. 1–130) and Ruetschi and Giovanoli (*J. Electrochem. Soc.*, 135(11), 1988, pp. 2663–9), incorporated herein by reference.

Electrochemical manganese dioxide is the preferred manganese dioxide for use in primary lithium cells. One consequence of the electrodeposition process is that EMD typically retains surface acidity from the sulfuric acid of the electrolysis bath. This residual surface acidity must be neutralized, for example, by treatment with a solution of aqueous base, before the EMD can be used as the active cathode material in primary lithium cells. Suitable aqueous bases include: sodium hydroxide, ammonium hydroxide (i.e., aqueous ammonia), calcium hydroxide, magnesium hydroxide, potassium hydroxide, lithium hydroxide, and combinations thereof. Typically, commercial EMD is neutralized with a strong base such as sodium hydroxide because it is highly effective and economical. However, before the neutralized EMD can be used, it must be heat-treated to remove residual water. The term "residual water", as used herein includes surface-adsorbed water, noncrystalline water (i.e., water physisorbed or occluded in pores) as well as water present in the crystal lattice in the form of protons. Heat-treatment of EMD prior to use in lithium cells is well known and has been described, for example, by Ikeda et al. (e.g., in "Manganese Dioxide as Cathodes for Lithium Batteries", *Manganese Dioxide Symposium*, Vol. 1, The Electrochemical Society, Cleveland, 1975, pp. 384–401), incorporated herein by reference.

EMD suitable for use in primary lithium cells can be prepared by heat-treating commercial EMD at temperatures between about 200 and 350° C. as taught by Ikeda et al. in U.S. Pat. No. 4,133,856. This reference discloses that it is preferable to heat-treat the EMD in two steps. The first step can be performed at a temperature greater than about 100° C., but below about 250° C. in order to drive off surface and non-crystalline water. The second step is performed at between about 250 and 350° C. to remove the lattice water. This two-step heat-treatment is disclosed to improve discharge performance of primary lithium cells because surface, non-crystalline, and lattice water can be removed. An undesirable consequence of the heat-treatment is that the $\gamma$-$MnO_2$-type structure is gradually converted to a gamma/beta ($\gamma/\beta$)-$MnO_2$-type structure at temperatures >350° C. The term "gamma/beta-$MnO_2$" as used in the art reflects the fact that a significant portion of $\gamma$-$MnO_2$ (i.e., the ramsdellite-type $MnO_2$ phase) is converted to $\beta$-$MnO_2$ during heat-treatment. At least about 30 percent by weight and typically between about 60 and 90 percent of the ramsdellite-type $MnO_2$ phase is converted to $\beta$-$MnO_2$ during conventional heat treatment as taught, for example, in U.S. Pat. No. 4,921,689. The produced $\gamma/\beta$-$MnO_2$ phase is less electrochemically active than EMD containing predominantly ramsdellite-type $MnO_2$. For example, cathodes containing EMD enriched in $\beta$-$MnO_2$ are disclosed in U.S. Pat. No. 5,658,693 to provide less lithium uptake capacity during discharge in lithium cells.

A method for preparing an improved manganese dioxide from commercial lithium grade EMD having a $\gamma$-$MnO_2$ structure that is not converted appreciably to the $\gamma/\beta$-$MnO_2$ structure by a heat-treatment of the type described hereinabove is disclosed in co-pending commonly assigned U.S. application Ser. No. 09/496,233, filed on Feb. 1, 2000. In the method disclosed in this reference, commercial lithium grade EMD is treated with a liquid source of lithium cations by a process that promotes stepwise ion-exchange of mobile hydrogen ions in the $\gamma$-$MnO_2$ crystal lattice and on the surface of the EMD particles with lithium cations followed by heat-treatment to eliminate residual water. After such heat-treatment, typically less than about 5 wt % of additional $\beta$-$MnO_2$ phase can be detected by x-ray powder diffraction analysis. In one aspect of the disclosed method, a suspension of commercial lithium grade EMD in water is treated with a basic lithium salt, such as lithium hydroxide, by a multi-step process in which the lithium salt is added incrementally with soaking periods between additions until a pH value between about 10 and 13 is obtained. During the soaking periods, hydrogen ions in the EMD crystal lattice can ion-exchange with lithium cations to form a lithium ion-exchanged intermediate product. This intermediate product is separated from the suspension, dried, and heat-treated. In another aspect of the disclosed method, an essentially dry mixture of commercial lithium grade EMD and a low melting point lithium salt, such as lithium nitrate, is heat-treated initially at a temperature above the melting point of the salt but less than about 300° C. and subsequently at a temperature greater than about 350° C., but less than about 420° C. The lithiated manganese dioxide products obtained by both processes were disclosed to have a stabilized γ-MnO$_2$-type crystal structure and to provide improved performance when used in primary lithium cells. Specifically, the average operating voltage of such cells at high discharge rates and low operating temperatures was disclosed to be substantially higher than that of primary lithium cells containing heat-treated manganese dioxide of prior art not treated stepwise with a liquid source of lithium cations prior to heat-treatment.

In addition to the prior art methods disclosed hereinabove, another method for preparing lithium manganese composite oxides having the formulas Li$_{0.33}$MnO$_2$ and LiMn$_2$O$_4$ for use in lithium ion rechargeable cells is disclosed by U.S. Pat. No. 5,911,920. The method disclosed in the reference includes pulverization and mixing of a lithium source compound such as lithium oxide, lithium hydroxide, lithium carbonate, and the like, with a manganese source compound such as manganese dioxide, manganese oxyhydroxide, and the like in a pre-determined mole ratio under an inert gas atmosphere for a sufficient period of time (e.g., 1–30 hours) to form a lithium manganese oxide composite. It was disclosed that after the period of mixing and pulverization, no x-ray diffraction peaks characteristic of either reactant could be detected for the mixture. The mixture was next heat-treated at pre-determined temperatures (e.g., <350° C. for Li$_{0.33}$MnO$_2$, 450–750° C. for LiMn$_2$O$_4$) to crystallize product phases and remove residual water. It also was disclosed that cathodes containing the heat-treated lithium manganese oxide composites had discharge capacities in lithium ion cells comparable to cathodes containing similar compositions produced by other methods of prior art.

Another method for preparing the lithium manganese oxide LiMn$_2$O$_4$ having a spinel structure via mechanochemical synthesis was reported by N. V. Kosova et al. (Journal of Solid State Chemistry, Vol. 146, 1999, pp. 184–8) and G. P. Ereiskaya et al. (Inorganic Materials, Vol. 32, no. 9, 1996, pp. 988–90; translated from Neorgan. Material., Vol. 32, No. 9, 1996, pp. 1121–30). This method includes high-energy milling or grinding of a mixture of β-MnO$_2$ and a lithium salt such as lithium hydroxide followed by heat-treatment. In contrast to the observations disclosed in U.S. Pat. No. 5,911,920 cited hereinabove, Kosova et al. reported no substantial changes in the x-ray diffraction patterns of reactant mixtures after 10 minutes of high-energy milling other than a general broadening of the peaks and a decrease in peak intensities due to a decrease in particle size and some amorphization. Also, no new peaks were observed before heat-treatment. Ereiskaya et al. concluded that such a mechanical activation process can accelerate the rate of spinel phase formation at temperatures between 150 and 500° C. well below the typical reaction temperature of ≧650° C. Kosova et al. suggested that during high energy milling of β-MnO$_2$ and LiOH, a redox reaction involving reduction of Mn$^{+4}$ cations by OH$^-$ anions can form Mn$^{+3}$ cations and promote diffusion of lithium cations into the particles. It was also concluded that the use of a lithium compound having hydroxyl groups is required since no chemical interaction was observed after high energy milling of β-MnO$_2$ and Li$_2$CO$_3$. These latter results are clearly in contradiction with results obtained by the method of the present invention.

A method for the mechanochemical synthesis of a lithium manganese oxide LiMnO$_2$ having a rocksalt-type crystal structure by high-energy ball milling of a mixture of lithium oxide, EMD, and manganese metal powders for extended periods (i.e., up to 48 hours) in an argon atmosphere has been reported by M. N. Obrovac et al. (Solid State Ionics, Vol. 112, 1998, pp. 9–19). However, discharge performance of cathodes containing the LiMnO$_2$ product in rechargeable lithium cells was reported to be poor.

Thus, even though considerable effort has been expended, as evidenced by the prior art cited hereinabove, the methods used to prepare lithium manganese oxides require additional refinement in order to improve substantially their performance when employed as active cathode materials for primary lithium cells.

SUMMARY OF THE INVENTION

It is a principal object of the invention to produce a lithiated manganese dioxide that results in improved discharge performance of lithium primary electrochemical cells when the lithiated manganese dioxide is employed as the active cathode material therein.

A principal aspect of the method of the present invention is directed to forming an essentially dry reaction mixture comprising manganese dioxide and a lithium salt and subjecting the reaction mixture to a mechanical activation process. Particulate rigid milling media are preferably added to the reaction mixture prior to mechanical activation. The manganese dioxide has a γ-MnO$_2$-type crystal structure, and can be, for example, an electrolytic manganese dioxide (EMD) or a chemical manganese dioxide (CMD). The reaction mixture, preferably with milling media therein, is subjected to mechanical activation to promote the ion-exchange of protons (viz., hydrogen ions) located in the γ-MnO$_2$ crystal lattice (as well as on the surface of the MnO$_2$ particles) by lithium cations. During mechanical activation, a lithiated manganese dioxide intermediate product having a γ-MnO$_2$-type crystal structure is formed. The intermediate product has the formula Li$_x$MnO$_2$, wherein $0.05 \leq x \leq 0.125$. The intermediate product is separated from the milling media and is subjected to a heat-treatment to remove residual water and form a lithiated manganese dioxide final product having a predominantly γ-MnO$_2$-type crystal structure and the formula Li$_y$MnO$_{2-\delta}$, wherein $0.05 \leq y \leq 0.175$ and $0.01 \leq \delta \leq 0.06$. The lithiated manganese dioxide final product can desirably be included in the cathode of a lithium primary electrochemical cell.

The term "essentially dry" as used herein shall be understood to include the possibility of residual water being present in the manganese dioxide and/or water of hydration associated with the lithium salt as well as water physisorbed by the reaction mixture. The term "residual water" as used herein in connection with the MnO$_2$ or the lithiated manganese dioxide intermediate product shall be understood to include water such as lattice water from unexchanged protons and also water in closed or open pores.

Further, the process of the present invention seeks to improve the lithiated manganese dioxide in a manner that preserves the total concentration of Mn$^{+4}$ cations. This can be accomplished by inserting lithium cations into the manganese dioxide crystal lattice predominantly via ion-exchange with protons rather than reductive insertion by lithium from the lithium salt during heat-treatment, which can produce undesirable reduction of Mn$^{+4}$ cations.

Thus, in one aspect of the invention, an essentially dry mixture of MnO$_2$, known in the art as "lithium grade" EMD or CMD, and a lithium salt, such as lithium hydroxide or lithium carbonate, is subjected to high-efficiency milling or grinding with small milling media at ambient temperature in air for a period of time ranging from about 0.25 to 8 hours followed by heat-treatment in air for about 4 to 12 hours at between 350 and 420° C. to remove residual water. The heat-treated lithiated manganese dioxide product can include from about 0.5 to 1.5 wt % lithium, preferably from about 0.75 to 1.25 wt % lithium.

It is a further object of the present invention to provide an electrochemical cell including a cathode containing the lithiated manganese dioxide prepared by the method of this invention, an anode, and an electrolyte having improved discharge performance. The anode can be lithium metal, a lithium alloy such as lithium aluminum alloy or a lithium-insertion compound. The electrolyte can be a liquid or a polymeric electrolyte. A suitable liquid electrolyte can be a solution containing an electrochemically stable lithium salt such as lithium trifluoromethanesulfonate dissolved in suitable organic solvents such as ethylene carbonate, propylene carbonate, 1,2-dimethoxyethane, and mixtures thereof.

The lithiated manganese dioxide prepared by the method of the present invention provides the following advantages. When included as the active cathode material in a primary lithium cell, the lithiated manganese dioxide provides higher average operating voltage compared with primary lithium cells of prior art when discharged at high rate, at low temperature, and especially at both high rate and low temperature. Accordingly, lithium primary cells containing the lithiated manganese dioxide of this invention are particularly useful for demanding high performance applications, for example, use in compact photographic cameras, digital cameras or digital video camcorders.

Other features and advantages of the invention will be readily apparent from the description of the preferred embodiments and from the claims.

DETAILED DESCRIPTION OF THE INVENTION

Figure 1:
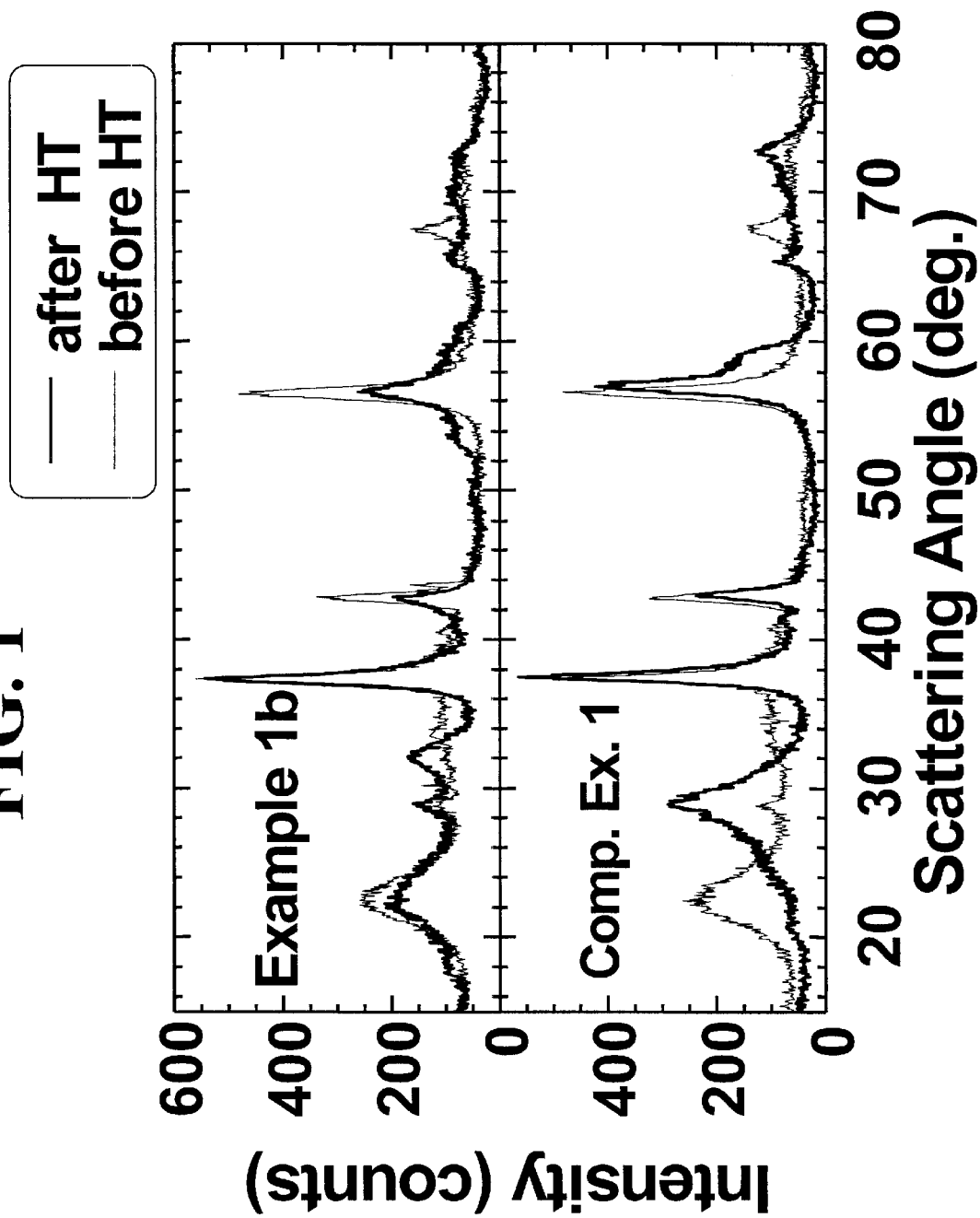
FIG. 1 is a graph depicting a comparison of x-ray powder diffraction patterns for EMD and the lithiated manganese dioxide prepared from EMD and $LiOH.H_2O$ having the nominal composition $Li_{0.12}MnO_2$ before and after heat-treatment (i.e.,"HT").

The process of the present invention involves forming a reaction mixture comprising manganese dioxide and a lithium salt and subjecting the reaction mixture to mechanical activation. A predetermined amount of particulate milling media is preferably added to the reaction mixture prior to mechanical activation. The manganese dioxide has a $\gamma\text{-}MnO_2$-type crystal structure and can be, for example, an electrolytic manganese dioxide (EMD) or a chemical manganese dioxide (CMD). The lithium salt is preferably selected from lithium oxide, lithium hydroxide, lithium hydroxide monohydrate, lithium carbonate, lithium nitrate, lithium nitrate hemihydrate, lithium oxalate, lithium methoxide or lithium peroxide, and any mixture thereof. The reaction mixture, preferably with milling media therein, is subjected to mechanical activation to promote ion-exchange of protons (viz., hydrogen ions) located in the $\gamma\text{-}MnO_2$ crystal lattice (as well as on the surface of the $MnO_2$ particles) by lithium cations. The mechanical activation is desirably carried out under ambient conditions, typically between about 15° C. and 40° C., that is, preferably without external heating, although optional external heating can be applied. During mechanical activation, a lithiated manganese dioxide intermediate product having a $\gamma\text{-}MnO_2$-type crystal structure and the formula $Li_xMnO_2$, wherein $0.05 \leq x \leq 0.125$, is formed. The intermediate product is separated from the milling media and is subjected to a heat-treatment to eliminate residual water whereupon a lithium manganese dioxide final product is formed having a predominantly $\gamma\text{-}MnO_2$-type crystal structure and the formula $Li_yMnO_{2-\delta}$, wherein $0.05 \leq y \leq 0.175$ and $0.01 \leq \delta \leq 0.06$. The lithiated manganese dioxide final product can desirably be included in the cathode of a lithium primary cell.

The term "mechanical activation" as used herein includes "mechanochemical activation", "mechanochemical synthesis", "mechanochemical processing", "reactive milling", and related processes. The term "mechanical activation" and in particular, "mechanochemical activation", as used herein is understood to include those processes whereby mechanical energy is used to activate, initiate or promote a chemical reaction, a crystal structure transformation or a phase change in a material or a mixture of materials. The term "mechanical activation" as used herein and in the claims with respect to the present invention shall be understood to mean agitating a reaction mixture in the presence of a milling media to transfer mechanical energy to the reaction mixture. The reaction mixture can be contained in a closed vessel or chamber. The term "agitating" or "agitation" as used herein shall include applying at least one, or any combination of two or more of the fundamental kinematic motions including translation (e.g., side-to-side shaking), rotation (e.g., spinning or rotating) and inversion (e.g., end-over-end tumbling) to the reaction mixture. Preferably, all three motions are applied to the reaction mixture. Such agitation can be accomplished with or without external stirring of the reaction mixture and milling media.

In the "mechanical activation" process of the present invention a mixture of reactant powders is combined in suitable proportions with milling media in a vessel or chamber that is mechanically agitated (i.e., with or without stirring) for a predetermined period of time at a predetermined intensity of agitation. Typically, a milling apparatus is used to impart motion to the milling media by the external application of agitation, whereby various translational, rotational or inversion motions or combinations thereof are applied to the vessel or chamber and its contents, or by the internal application of agitation through a rotating shaft terminating in a blade, propeller, impeller or paddle or by a combination of both actions. Typical processes that can be mechanically activated by the methods described herein include: initiation of chemical reactions, for example, solid state reactions such as metal alloy formation, oxidation/ reduction reactions, ion-exchange reactions, substitution reactions, etc.; intercalation (and de-intercalation) reactions; dehydration; formation of point, surface, and lattice defects in crystals; generation of dislocations in crystal lattices; initiation of polymorphic phase transformations; formation of metastable phases; refinement of crystallite size; amorphization of crystalline phases; and the like. Such processes can be promoted under nominally ambient conditions in the absence of added liquids or solvents. A more detailed description of various aspects of mechanochemical processing is provided by P. G. McCormick and F. H. Froes ("The Fundamentals of Mechanochemical Processing", Journal of Metals, vol. 50, 1998, pp 61–65) and E. M. Gutman ("Mechanochemistry of Materials", Cambridge Internat. Science Publ., 1998) and references cited therein.

In the method of the present invention, a predetermined amount of milling media, preferably chemically-inert, rigid milling media, is added to an essentially dry reaction mixture comprising a manganese dioxide and a lithium salt, prior to mechanical activation. Typically, the weight ratio of reaction mixture to milling media can range from about 1:3 to 1:40. The reaction mixture is subjected to mechanical activation, for example, in a milling apparatus whereby the reaction mixture is agitated in the presence of milling media at ambient temperature, that is, without the need for external heating. By the term "chemically-inert" milling media as used herein is meant that the milling media does not react chemically with any of the components of the reaction mixture. The rigid milling media advantageously comprises various materials such as ceramic, glass, metal or polymeric compositions, in a particulate form. Preferred ceramic materials, for example, can be selected from a wide array of ceramics desirably having sufficient hardness and friability to enable them to avoid being chipped or crushed during milling and also having sufficiently high density. Suitable densities for milling media can range from about 3 to 15 $g/cm^3$. Preferred ceramic materials can be selected from steatite, aluminum oxide, zirconium oxide, zirconia-silica, yttria-stabilized zirconium oxide, magnesia-stabilized zirconium oxide, silicon nitride, silicon carbide, cobalt-stabilized tungsten carbide, and the like. Preferred glass milling media are spherical (e.g., beads), have a narrow size distribution, are durable, and include, for example, lead-free soda lime glass and borosilicate glass. Suitable metal milling media are typically spherical and generally have good hardness (i.e., RHC 60–70), extreme roundness, high wear resistance, and narrow size distribution and can include, for example, balls fabricated from type 52100 chrome steel, type 316 or 440C stainless steel or type 1065 high carbon steel. Polymeric milling media are preferably substantially spherical and can be selected from a wide array of polymeric resins having sufficient hardness and friability to enable them to avoid being chipped or crushed during milling, abrasion-resistance to minimize attrition resulting in contamination of the product, and freedom from impurities such as metals, solvents, and residual monomers. Preferred polymeric resins, for example, can be selected from crosslinked polystyrenes, such as polystyrene crosslinked with divinylbenzene, styrene copolymers, polyacrylates such as polymethylmethacrylate, polycarbonates, polyacetals, vinyl chloride polymers and copolymers, polyurethanes, polyamides, high density polyethylenes, polypropylenes, and the like. The use of polymeric milling media to grind materials down to a very small particle size is disclosed, for example, in U.S. Pat. Nos. 5,478,705 and 5,500,331. Polymeric resins typically can have densities ranging from about 0.8 to 3.0 $g/cm^3$. Higher density polymeric resins are preferred. Alternatively, the milling media can be composite particles comprising dense core particles having a polymeric resin adhered thereon. Core particles can be selected from materials known to be useful as milling media, for example, glass, alumina, zirconia silica, zirconium oxide, stainless steel, and the like. Preferred core materials have densities greater than about 2.5 $g/cm^3$.

Typically, rigid milling media can be in the form of particles desirably having a variety of smooth, regular shapes, flat or curved surfaces, and lacking sharp or raised edges. For example, suitable milling media can be in the form of particles having ellipsoidal, ovoid, spherical or right cylindrical shapes. Preferably, the milling media is in the form of beads, balls, spheres, rods, right cylinders, drums or radius-end right cylinders (i.e., right cylinders having hemispherical bases with the same radius as the cylinder). The milling media desirably has an effective mean particle diameter (i.e., "particle size") between about 0.1 and 10 mm. As used herein, the term "effective mean particle diameter" is defined as the mean diameter of the smallest circular hole through which a particle can pass freely. For example, the effective mean particle diameter of a spherical particle corresponds to the mean particle diameter and the effective mean particle diameter of an ellipsoidal particle corresponds to the mean length of the longest minor axis.

During mechanical activation, the milling media facilitate the direct transfer of mechanical energy generated by the interaction of the milling media and the milling apparatus during the rotation, translation, inversion or agitation thereof to the reactant powders without significant bulk heating of the mixture. Motion imparted to the milling media can result in application of shearing forces as well as multiple impacts or collisions having significant intensity between milling media particles and particles of the reactant powders. The efficiency of mechanical energy transfer from the milling media to the reactant particles is influenced by a wide variety of processing parameters including: the type of milling apparatus; the intensity of the forces generated, the kinematic aspects of the process; the size, density, shape, and composition of the milling media; the weight ratio of the reaction mixture to the milling media; the duration of activation; the physical properties of both reactant and product powders; the atmosphere present during activation; and also others.

It is well known that intensive mixing, milling or grinding of mixtures of binary metal oxides in the presence or absence of milling media can generate solid solutions including previously known ternary metal oxides that also can be produced by conventional thermal methods. Although the presence of free water is not required for the mechanochemical activation process, reactions that include mixtures of hydrated metal oxides, metal oxyhydroxides or other hydrous or hydrated metal compounds are well known to proceed faster than reactions involving mixtures of dried or anhydrous metal oxides. In general, the apparent acceleration of chemical reactions by water or hydroxyl groups can be attributed to Bronsted-Lowry acid-base interactions between sites on the surfaces of the reactant metal oxide particles. A detailed discussion of the role played by water in mechanochemically activated processes is presented, for example, by M. Senna (Solid State Ionics, 63–65, 1993, pp. 3–9). Another consequence of intensive milling or grinding of metal oxide powders is the generation of virgin, unpassivated surfaces that exhibit enhanced reactivity. The enhanced reactivity of such surfaces provides particles that are especially susceptible to cold-welding that can produce larger particles. However, in many cases the general physical and chemical principles governing mechanochemical activation are incompletely understood and can depend strongly on the specific reactants and products.

In one embodiment of the present invention, an essentially dry reaction mixture consisting of a non-heat-treated manganese dioxide having a $\gamma$-$MnO_2$-type crystal structure and a lithium salt in a pre-determined Li/Mn atom ratio ranging from about 0.05 to 0.18 is combined with milling media and is subjected to mechanical activation at ambient temperature in air for a period of time ranging from about 0.15 to 12 hours to form a lithium ion-exchanged manganese dioxide intermediate product having the formula $Li_xMnO_2$, wherein $0.05 \leq x \leq 0.125$, and retaining the $\gamma$-$MnO_2$-type crystal structure. The preferred weight ratio of reaction mixture to milling media ranges from about 1:4 to 1:10. Preferred mechanical activation times range from about 0.25 to 8 hours and more preferred from 0.5 to 5 hours. Mechanical activation is preferably accomplished without causing significant (e.g., greater than about 10%) particle size reduction of the $MnO_2$ particles. Optimum activation times depend strongly on the physical properties of the particular reactant powders, milling media, and the specific process conditions. Preferred milling media are spherical ceramic media ranging in mean diameter from about 0.2 to 5 mm, more preferably from about 0.5 to 2 mm. Preferred density for the ceramic milling media is greater than about 4 $g/cm^3$. Suitable ceramic media can be chosen from medium density (i.e., 4.1 $g/cm^3$) fused zirconium oxide (e.g., 64% $ZrO_2$, 35% $SiO_2$, 1% $Al_2O_3$ by weight), high density (i.e., 5.5 $g/cm^3$) zirconium oxide stabilized with magnesia (e.g., 97% $ZrO_2$, 3% MgO), and very high density (i.e., 6.0 $g/cm^3$) zirconium oxide stabilized with yttria (e.g., 95% $ZrO_2$, 5% $Y_2O_3$). Preferred ceramic milling media are high density zirconium oxide beads stabilized with magnesia or yttria. After mechanical activation and preferably before heat-treatment, the ceramic milling media can be separated from the lithiated manganese dioxide intermediate product using conventional separation techniques such as dry sieving through a mesh screen, vacuum filtration, or centrifugation.

Suitable manganese dioxides include: $\gamma$-$MnO_2$, $\epsilon$-$MnO_2$, EMD, CMD, and p-CMD prepared as described by U.S. Pat. No. 5,277,890. Commercial lithium grade EMD and CMD powders having sodium contents less than 500 ppm and mean particle sizes between 10 and 60 microns are preferred. Suitable solid lithium salts can be chosen from: lithium oxide, lithium hydroxide, lithium hydroxide monohydrate, lithium methoxide, lithium carbonate, lithium oxalate, lithium peroxide, lithium nitrate, and lithium nitrate hemihydrate. Preferred lithium salts are not anhydrous and include lithium carbonate, lithium hydroxide monohydrate, and lithium nitrate.

The mechanical activation process of the present invention is accomplished most advantageously by a milling apparatus that can repeatedly apply compressive forces and shear stress to the particles of the reaction mixture. A suitable milling apparatus can be selected from the following: high-energy ball, sand, bead or pearl mills, basket mill, planetary mill, vibratory action ball mill, multi-axial shaker/mixer, stirred ball mill, horizontal small media mill, multi-ring pulverizing mill of the type disclosed in U.S. Pat. No. 5,795,537, and the like including small milling media. The milling apparatus also can contain one or more rotating shafts. One preferred milling apparatus for performing the mechanical activation process of this invention is a multi-axial shaker/mixer having the tradename "Turbula" available commercially from Willy A. Bachofen AG Machinenfabrik. Suitable rates of agitation and total activation times are strongly dependent on the type and size of milling apparatus as well as the milling media, the weight ratio of the reaction mixture to milling media, the chemical and physical properties of the reactant and product powders, and other parameters that must be optimized empirically.

It is theorized by the applicants that during the mechanical activation process of the present invention the impact of the milling media with particles of manganese dioxide and lithium salt can result in the application of a coating of the soft lithium salt particles onto the surfaces of the harder manganese dioxide particles. It is further theorized that because of the high porosity of the manganese dioxide particles, a portion of the lithium salt can be advantageously introduced into open surface pores whereby the lithium salt is placed in contact with or in close proximity to residual water therein. Because of the small amount of residual water in contact with the lithium salt, a saturated solution of the lithium salt can be formed thereby promoting ion-exchange of protons in the crystal lattice of the manganese dioxide by lithium cations in the manner disclosed in commonly assigned co-pending U.S. application Ser. No. 09/496,233, filed on Feb. 1, 2000.

Mechanical activation of the mixture of manganese dioxide and lithium salt powders for an inadequate period of time (e.g., less than about 10 minutes) can result in non-homogeneity of the reaction mixture and the formation of undesirable lithium manganese oxide phases such as $Li_2MnO_3$ having a rocksalt-type structure as well as considerable amounts of $\beta$-$MnO_2$ during heat-treatment. Prolonged mechanical activation (e.g., >24 hours) is also undesirable since the lithium manganese dioxide product obtained after heat-treatment exhibits poor discharge performance when included in the cathode of primary lithium cells.

The lithiated manganese dioxide intermediate product is heat-treated in an oxidizing atmosphere typically for about 4 to 12 hours at between about 350 and 420° C. to remove residual water and produce a lithiated manganese dioxide final product having the formula $Li_yMnO_{2-\delta}$, wherein $0.05 \leq y \leq 0.175$ and $0.01 \leq \delta \leq 0.06$. It is necessary to provide an oxidizing atmosphere during heat-treatment in order to minimize reduction of $Mn^{+4}$ to $Mn^{+3}$ in the lithiated manganese dioxide final product. Suitable oxidizing atmospheres include air, air containing an increased partial pressure of oxygen, and oxygen. The use of an inert or reducing atmosphere such as argon, nitrogen or carbon dioxide during heat-treatment is undesirable since reduction of $Mn^{+4}$ to $Mn^{+3}$ forms a product having decreased discharge capacity in a primary lithium cell. The lithiated manganese dioxide final product has a predominently $\gamma$-$MnO_2$-type crystal structure, not a rocksalt or spinel-type crystal structure.

In another embodiment, the present invention features inclusion of the lithiated manganese dioxide in the cathode of a primary lithium cell. Primary lithium cells can be fabricated in the form of button or coin cells, prismatic or flat cells, as well as traditional cylindrical cells having a spirally-wound anode and cathode with a separator sheet positioned therebetween. This latter electrode configuration is well known in the art and an embodiment thereof is described in detail, for example, in U.S. Pat. No. 4,707,421. Compositions for the electrodes, separator, and electrolyte as disclosed in U.S. Pat. No. 4,707,421 are also suitable for the primary lithium cells of the present invention except that the manganese dioxide cathode material can be substituted by the lithiated manganese dioxide cathode material prepared by the method of this invention.

The cathode active material includes the lithiated manganese oxide prepared by the method of the present invention alone or in a physical admixture with conventionally heat-treated manganese dioxide. The cathode active material typically is mixed with a suitable polymeric binder, for example, poly(tetrafluoroethylene), conductive agents, for example, carbon black, acetylene black or graphite, and a coating vehicle, for example, water or an organic solvent, to produce a paste or slurry that can be applied to an electrically-conductive substrate serving as a current collector, for example, a metal grid, an expanded metal foam or a metal foil to form a cathode. Cathodes of appropriate size and shape can be cut from coated substrate.

The anode preferably consists of lithium metal, a lithium alloy, or a lithium insertion compound. An alloying metal, such as aluminum, typically can be present at a concentration less than about 1 percent by weight.

A separator layer is located between the two electrodes. The separator layer typically consists of a porous polymer film or thin sheet that serves as a spacer and prevents electrical contact between the cathode and anode while allowing electrolyte to move freely through pores. Suitable separator layers include relatively non-reactive polymers such as, for example, polypropylene, polyethylene, polyamide (i.e., nylon), polysulfone, or polyvinyl chloride (PVC). The separator has a preferred thickness between about 10 and 200 microns and a more preferred thickness between about 20 and 50 microns.

The nonaqueous electrolyte can be any liquid nonaqueous electrolyte or combination of liquid nonaqueous electrolytes known in the art. The nonaqueous electrolyte can optionally include a polymeric electrolyte. Typically, liquid nonaqueous electrolytes suitable for use in a primary lithium/$MnO_2$ cell consist of a lithium electrolyte salt dissolved in a dry organic solvent or mixture of dry organic solvents. Suitable lithium electrolyte salts include: lithium perchlorate ($LiClO_4$), lithium trifluoro-methylsulfonate ($LiCF_3SO_3$), lithium hexafluorophosphate ($LiPF_6$), lithium hexafluoroarsenate ($LiAsF_6$), lithium tetrafluoroborate ($LiBF_4$), lithium bis(trifluoro-methylsulfonyl) imide ($Li(CF_3SO_2)_2N$), lithium bis(perfluoro-ethylsulfonyl) imide ($Li(CF_3CF_2SO_2)_2N$), and lithium tris (trifluoromethanesulfonyl) methide ($Li(CF_3SO_2)_3C$). Suitable organic electrolyte solvents include: ethylene carbonate (EC), propylene carbonate (PC), butylene carbonate (BC), dimethylcarbonate (DMC), and the like; dimethoxyethane (DME); dioxolane; γ-butyrolactone; diglyme; and mixtures thereof. A preferred electrolyte composition consists of a 0.6 M solution of lithium trifluoromethanesulfonate (i.e., $CF_3SO_3Li$; available under the tradename, FC-122, from 3M) dissolved in a mixture of dry ethylene carbonate (EC), propylene carbonate (PC), and dimethoxyethane (DME) in the volume ratio 1:2:7.

The electrodes, separator, and liquid or polymeric nonaqueous electrolyte are contained within a case or can. The case can take the form of a coin cell, button cell, cylindrical cell, prismatic cell, laminar cell or other standard cell geometry. The case can be made of a metal such as nickel, nickel clad or plated steel, stainless steel, aluminum or a polymeric material such as PVC, polypropylene, polysulfone, acrylic acid-butadiene-styrene terpolymer (ABS), or polyamide. After the nonaqueous electrolyte solution is added to the cell, the case is tightly sealed to confine the electrolyte and inhibit infiltration by moisture and air into the cell.

A significant discharge performance advantage is obtained when a lithiated manganese dioxide having a nominal composition of $Li_yMnO_{2-\delta}$ wherein $0.05 \leq y \leq 0.175$ and $0.01 \leq \delta \leq 0.06$ and having a predominantly γ-$MnO_2$-type crystal structure prepared by the method of the present invention is used as the cathode active material in a primary lithium cell. In particular, the lithiated manganese dioxide cathode material provides significant increases in both initial and average operating voltages compared to non-lithiated manganese dioxide or other lithiated manganese oxides of prior art. It is theorized by the applicants that the higher operating voltages can be attributed, at least in part, to additional stabilization of the ramsdellite-type $MnO_2$ component of the γ-$MnO_2$ crystal lattice by the presence of lithium cations during heat-treatment. It is further theorized by the applicants that because the ramsdellite-type $MnO_2$ crystal structure contains larger tunnels (1×2) than β-$MnO_2$ (1×1), stabilization of the structure having the larger tunnels facilitates subsequent lithium cation insertion into the crystal lattice during cell discharge. Also, the lithiated manganese dioxide of the present invention has an added benefit in that the total discharge capacity can be greater, particularly at high rates of discharge, at low temperatures or at both high rate of discharge and low temperature, than heat-treated un-lithiated manganese dioxide or other lithiated manganese oxides of prior art.

The following examples illustrate the invention.

EXAMPLE 1

Lithiated manganese dioxides were prepared in the following manner: In a polypropylene container having an internal volume of about 250 ml, 100.0 g (1.15 mole) of commercial lithium grade EMD (e.g., from Delta E.M.D. (Pty), Ltd. or Kerr-McGee Chemical Co.) having low sodium content (<500 ppm Na), low lithium content (<600 ppm Li), a pH value of about 5, and an average particle size of about 30–50 μm; and either 4.00 g (0.095 mole), 6.00 g (0.143 mole) or 8.00 g (0.191 mole) of reagent grade lithium hydroxide monohydrate ($LiOH.H_2O$) for Examples 1a, 1b, and 1c, respectively; were combined with a 500.0 g portion of 1 mm diameter spherical yttria-stabilized zirconium oxide milling media. The weight ratio of reactant powders to milling media was about 1:5. The mixtures were mechanically activated using a Turbula mixer/shaker at a maximum agitation speed of 90 rpm for a period of 1 hour. The intermediate product powders were separated from the milling media by dry sieving and heat-treated in ambient air at about 380° C. for 8 hours. Nominal compositions of the final products of Examples 1a, 1b, and 1c are $Li_{0.08}MnO_2$, $Li_{0.12}MnO_2$, and $Li_{0.18}MnO_2$, respectively. Values for total lithium and manganese contents were determined by inductively coupled plasma atomic emission spectroscopy (ICP/AES), oxygen stoichiometry by titrimetry as x in $MnO_x$, and specific surface areas from nitrogen adsorption isotherms by the B.E.T. method and are given in Table 1.

TABLE 1

| Sample | Li/Mn atomic ratio | Total % Li (w/w) | % Mn (w/w) | x in $MnO_x$ | SSA (m²/g) |
|---|---|---|---|---|---|
| Ex. 1a | 0.08 | 0.66 | 60.3 | 1.95 | 38.7 |
| Ex. 1b | 0.12 | 0.95 | 60.0 | 1.93 | 37.5 |
| Ex. 1c | 0.18 | 1.40 | 59.6 | 1.92 | 37.9 |
| Ex. 2a | 0.08 | 0.64 | 60.4 | 1.95 | 38.1 |
| Ex. 2b | 0.12 | 0.96 | 60.7 | 1.95 | 40.1 |
| Ex. 3a | 0.08 | 0.55 | 61.4 | 1.95 | 39.8 |
| Ex. 3b | 0.12 | 0.97 | 60.8 | 1.945 | 38.3 |

TABLE 1-continued

| Sample | Li/Mn atomic ratio | Total % Li (w/w) | % Mn (w/w) | x in MnO$_x$ | SSA (m$^2$/g) |
|---|---|---|---|---|---|
| Comp.Ex. 1 | <0.005 | 0.038 | 60.7 | 1.97 | 33.8 |
| Comp.Ex. 2 | 0.0 | <0.005 | 60.9 | 1.94 | 40.2 |
| Comp.Ex. 3 | 0.15 | 1.24 | 60.6 | 1.95 | 25.4 |

Total lithium content, relative oxygen stoichiometry (O/Mn) and %OH$^-$ and %CO$_3^=$ (determined titrimetrically) for the intermediate product of Example 1b before heat-treatment, as well as for the final lithiated manganese dioxide product of Example 1b after heat-treatment are compared in Table 2. The value for %CO$_3^=$ also was calculated from the total carbon content determined by LECO total carbon analysis. The values for %OH$^-$ and %CO$_3^=$ can be attributed to lithium hydroxide and lithium carbonate, respectively, remaining on the surface of the EMD particles. The amount of Li$^+$ introduced into the EMD particles by ion-exchange can be estimated by subtracting the value for the combined Li content of the residual LiOH and Li$_2$CO$_3$ from the value for total Li content. In the case of the intermediate product before heat-treatment, up to about 55% of the lithium may be present in the interior of the EMD particles. After heat-treatment, about 80% of the lithium appeared to have migrated into the EMD particles. However, the distribution of the lithium cations inside the EMD particles was not determined.

TABLE 2

| Sample | Heat treat | Nominal % Li | Total % Li | x in MnO$_x$ | % OH$^-$ | % CO$_3^=$ | % Li in MnO$_2$ |
|---|---|---|---|---|---|---|---|
| Ex. 1b | before | 0.94 | 0.89 | 1.96 | 0.83 | 0.51 | 0.49 |
| Ex. 1b | after | 0.98 | 0.95 | 1.93 | 0.21 | 0.88 | 0.76 |

The estimated extent of lithium introduction into the EMD particles is consistent with a partial ion-exchange of lattice protons by Li$^+$ cations during the mechanochemical processing. Since the average oxidation state of Mn in the intermediate product of Example 1b, is essentially the same as that of Mn in the reactant EMD (i.e., x=1.96–1.97), there is no evidence for lithium insertion by any reaction involving reduction of Mn$^{+4}$ ions. Heat-treatment of the intermediate product promotes insertion of additional Li$^+$ cations into the EMD lattice by a reaction that reduces some of the Mn$^{+4}$ ions to Mn$^{+3}$ ions, as reflected by a decrease in relative oxygen stoichiometry.

Powder x-ray diffraction patterns of the lithiated manganese dioxide were obtained using Cu-K$_\alpha$ radiation. Background intensity was adjusted to less than 5% of the total intensity of the principal diffraction peak. Instrumental resolution of the scattering angle, 2$_\theta$, was better than 0.3 degree. The x-ray diffraction pattern for the Li$^+$ ion-exchanged intermediate product of Example 1b before heat-treatment is overlaid on that for the final product after heat-treatment in FIG. 1. The observed diffraction peaks can be indexed based on an orthorhombic ramsdellite-type unit cell. Because the x-ray diffraction pattern after heat-treatment is still consistent with that for a γ-MnO$_2$-type crystal structure having high levels of disorder, it is clear that heat-treatment of the ion-exchanged intermediate does not induce significant changes in the crystal structure. This is in sharp contrast to lithium grade EMD which has been converted to the γ/β-MnO$_2$ phase by heat-treatment as shown in FIG. 1. The x-ray diffraction pattern for the heat-treated final product of Example 1c having a nominal composition of Li$_{0.18}$MnO$_2$ exhibits several additional diffraction peaks which can be assigned to a lithium manganese oxide phase having the nominal composition Li$_y$MnO$_2$ with 0.33≦y≦0.43, as disclosed in U.S. Pat. No. 4,959,282, as a minor impurity.

EXAMPLE 2

Lithiated manganese dioxides were prepared in the same general manner as described for the lithiated manganese dioxide products of Example 1 except that 3.50 g (0.047 mole) and 5.30 g (0.072 mole) of reagent grade lithium carbonate were substituted in Examples 2a and 2b for the 4.00 g and 6.00 g of lithium hydroxide monohydrate used in Examples 1a and 1b, respectively. Also, the total time that the mixtures of reactant powders were mechanically activated was increased from 1 hour to 5 hours. The formed intermediate products were heat-treated as in Example 1. Nominal compositions of the final products of Examples 2a and 2b are Li$_{0.08}$MnO$_2$ and Li$_{0.02}$MnO$_2$, respectively. Values for total lithium and manganese contents, relative oxygen stoichiometry (O/Mn), and B.E.T. specific surface area are given in Table 1.

Figure 2:
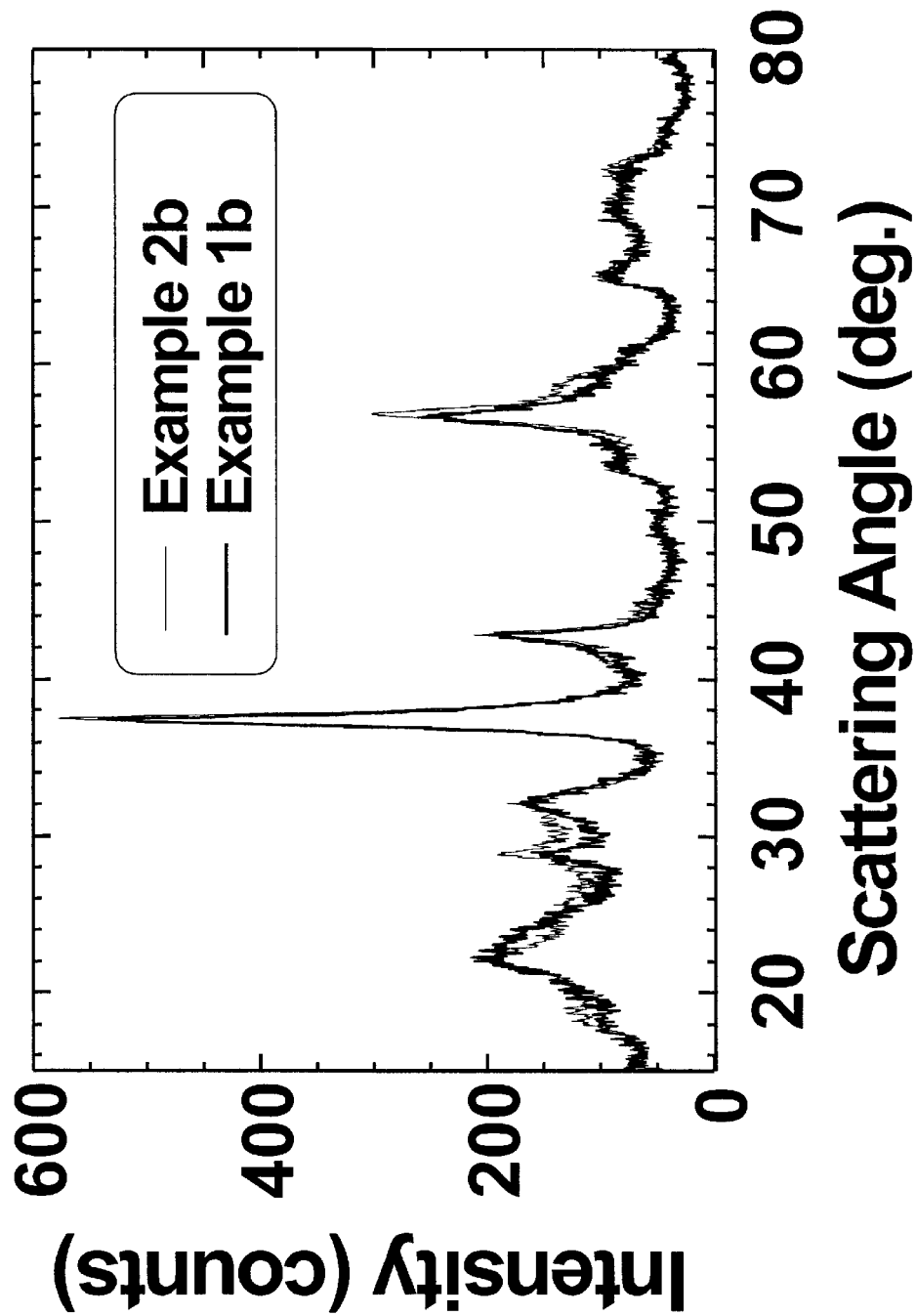
FIG. 2 is a graph depicting a comparison of x-ray powder diffraction patterns for lithiated manganese dioxides having the nominal composition $Li_{0.12}MnO_2$ prepared from EMD and either $Li_2CO_3$ or $LiOH.H_2O$.

The x-ray powder diffraction pattern for the Li$^+$ ion-exchanged product of Example 2b after heat-treatment is overlaid on that for the corresponding Li$^+$ ion-exchanged product of Example 1b in FIG. 2. The x-ray diffraction patterns correspond closely, clearly indicating that the same Li$_{0.12}$MnO$_2$ product phase can be obtained using either lithium hydroxide or lithium carbonate as the lithium salt.

Values for total lithium content, relative oxygen stoichiometry, %OH$^-$, and %CO$_3^=$ (by titration) are compared in Table 3 for the intermediate product of Example 2a before heat-treatment and for the final product after heat-treatment. The amount of Li$^+$ introduced into the EMD particles during mechanical activation was estimated as described for Example 1b. In the case of the intermediate product before heat-treatment, about 50% of the lithium may be present in the interior of the EMD particles. After heat-treatment, about 85% of the lithium appeared to have migrated into the EMD particles.

TABLE 3

| Sample | Heat treat | Nominal % Li | Total % Li | x in MnO$_x$ | % OH$^-$ | % CO$_3^=$ | % Li in MnO$_2$ |
|---|---|---|---|---|---|---|---|
| Ex. 2a | before | 0.63 | 0.60 | 1.96 | 0.21 | 0.88 | 0.31 |
| Ex. 2a | after | 0.66 | 0.64 | 1.95 | 0.14 | 0.24 | 0.55 |

Figure 3:
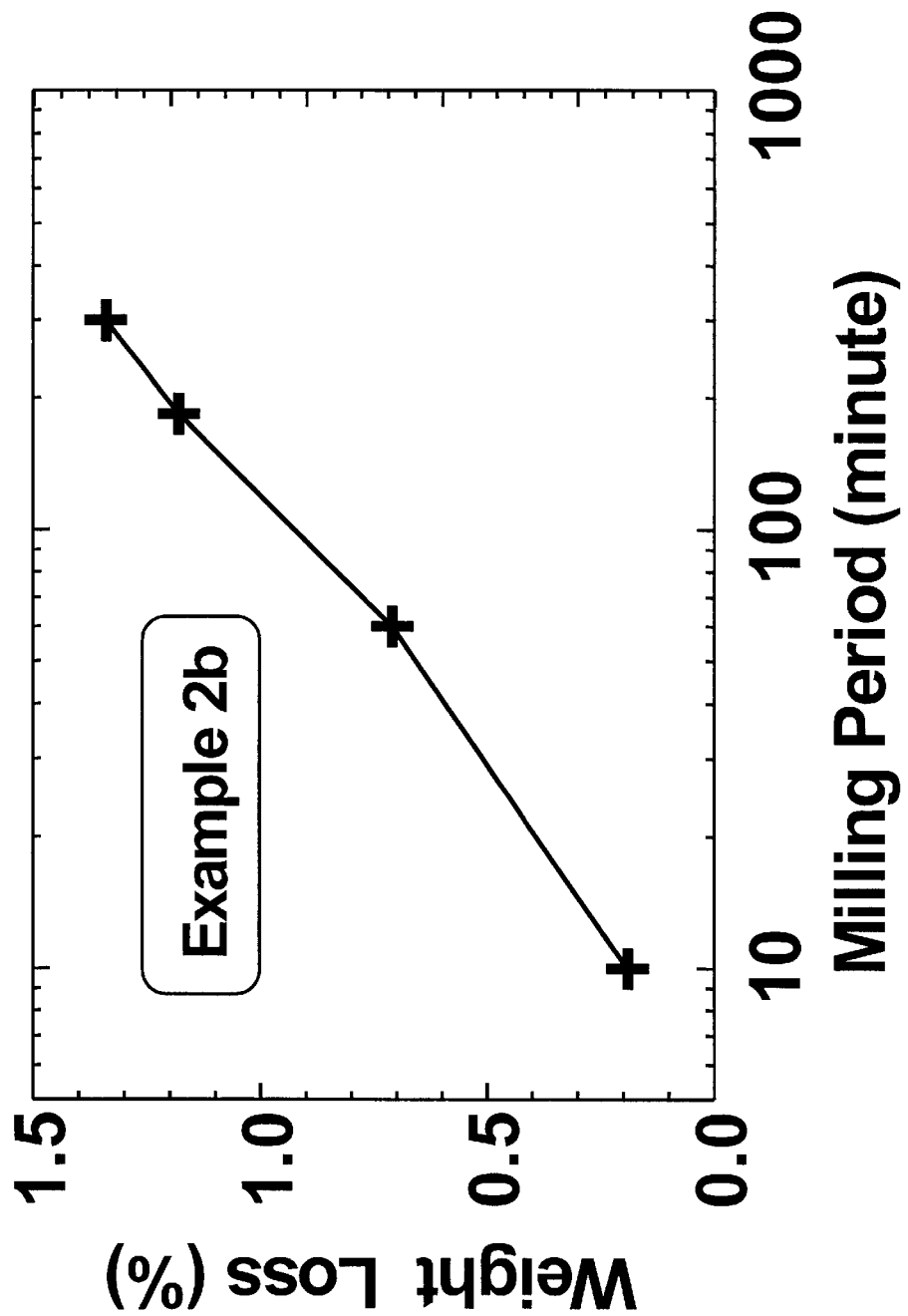
FIG. 3 is a graph depicting percentage weight loss during mechanical activation of a mixture of EMD and $Li_2CO_3$ as a function of treatment time.

During mechanical activation of mixtures of EMD and lithium carbonate, a substantial increase in gas pressure inside the sealed polypropylene container was typically observed. Such a pressure increase was not observed during the mechanical activation of mixtures of EMD and lithium hydroxide monohydrate in Example 1. The amount of gas evolved was quantified as a weight loss after the container was opened. Gas chromatographic (glc) analysis of the evolved gas revealed that it consisted of carbon dioxide and some water vapor. The percentage weight loss by the reactant mixture of Example 2b as a function of activation time was measured and is shown in FIG. 3. The evolution of carbon dioxide gas during mechanical activation of EMD and lithium carbonate mixtures is consistent with a reaction involving partial ion-exchange of Li$^+$ ions for protons in the EMD lattice as summarized in Equation 1:

$$(H_y)MnO_2 + \delta Li_2CO_3 \rightarrow Li_{2\delta}(H_{y-\delta})MnO_2 + \delta CO_2 + \delta H_2O \quad \text{Eq. 1}$$

Since the oxidation state of Mn in the intermediate ion-exchanged product is essentially the same as that of Mn in the starting EMD, as for Example 1, there is no evidence for lithium insertion by any other reaction involving reduction of $Mn^{+4}$ cations. During subsequent heat-treatment of the intermediate product of Example 2a, additional $Li^+$ ions are inserted into the EMD lattice by a reaction that results in reduction of some $Mn^{+4}$ cations.

EXAMPLE 3

Lithiated manganese dioxides were prepared in the same manner as the lithiated manganese dioxides of Example 2 except that a commercial lithium grade ammonia neutralized CMD powder (e.g., Type 45CD from Erachem) having a low sodium content (<300 ppm Na), a pH of about 5, and an average particle size of about 15–20 microns was substituted for the EMD of Example 2. The amounts of lithium carbonate powder used to prepare the lithiated manganese dioxide products of Examples 3a and 3b are the same as those used to prepare the products of Example 2a and 2b, respectively. The ion-exchanged intermediate products of Example 3 were heat-treated as in Example 2. Nominal compositions of the final products of Examples 3a and 3b are $Li_{0.08}MnO_2$ and $Li_{0.12}MnO_2$, respectively. Values for total lithium and manganese contents, relative oxygen stoichiometry (O/Mn), and specific surface area are given in Table 1.

The specific surface areas for the heat-treated lithiated manganese dioxides of Examples 3a and 3b prepared from CMD and $Li_2CO_3$ are comparable to those for the corresponding heat-treated products of Examples 1a and 1b prepared from EMD and LiOH and Examples 2a and 2b prepared from EMD and $Li_2CO_3$. These specific surface areas are comparable to those measured for corresponding samples of heat-treated EMD and CMD that were not lithiated. This is consistent with no substantial change in the average size of the $MnO_2$ particles during mechanical activation.

The x-ray powder diffraction pattern for the $Li^+$ ion-exchanged product of Example 3b after heat-treatment is nearly identical to that of the corresponding $Li^+$ ion-exchanged product of Example 2b shown in FIG. 2. Thus, the same $Li_{0.12}MnO_2$ product phase can be obtained using either EMD or CMD as the reactant manganese dioxide.

COMPARATIVE EXAMPLE 1

A sample of commercial "lithium grade" EMD ($\gamma$-$MnO_2$) having a low sodium content (<500 ppm Na), a pH of about 5.2, and an average particle size of about 40–50 $\mu$m was placed in an alumina tray, heated in air at 380° C. for a period of 8 hours, and allowed to cool at 10° C./minute in air to room temperature. The x-ray powder diffraction pattern of the heat-treated product exhibited major peaks characteristic of $\gamma$-$MnO_2$ and $\beta$-$MnO_2$ as typically observed for a heat-treated EMD having a $\gamma/\beta$-$MnO_2$ crystal structure as shown in FIG. 1. Total lithium and manganese contents, relative oxygen stoichiometry, and specific surface area of the heat-treated EMD are given in Table 3.

COMPARATIVE EXAMPLE 2

A sample of a commercial lithium grade ammonia-neutralized CMD powder (e.g., Type 45CD from Erachem) having a low sodium content (<300 ppm Na), a pH of about 5, and an average particle size of about 15–20 microns was placed in an alumina tray, heated in air at 380° C. for a period of 8 hours, and allowed to cool in air at 10° C./minute to room temperature. The x-ray powder diffraction pattern of the product exhibited additional major peaks characteristic of $MnO_2$ typically observed for a heat-treated CMD having a $\gamma/\beta$-$MnO_2$ crystal structure and similar to that for a heat-treated EMD. Total lithium and manganese contents, relative oxygen stoichiometry, and specific surface area of the heat-treated CMD are given in Table 3.

COMPARATIVE EXAMPLE 3

A lithiated manganese dioxide was prepared in the manner disclosed in commonly assigned co-pending U.S. application Ser. No. 09/496,233, filed Feb. 1, 2000. About 2 kg (23.0 moles) of commercial lithium grade EMD (e.g., available from Delta E.M.D. (Pty), Ltd. or Kerr-McGee Chemical Co.) containing less than 500 ppm Na and less than 600 ppm Li, having a pH of about 5, and also having an average particle size of about 30–50 microns was added with rapid stirring to 2 liters of deionized water to form a suspension. The EMD suspension was stirred rapidly and the pH increased gradually from an initial value of about 4.5 to 5.0 by adding small portions of solid lithium hydroxide powder. A total of about 100 g (4.2 moles) of lithium hydroxide was added to obtain a final pH value of nearly 12.5. The EMD suspension was stirred at room temperature for about 8 to 12 hours to allow the ion-exchange process to take place. During the ion-exchange process the pH decreased slightly and additional solid lithium hydroxide was added to compensate for the decrease. The suspension was stirred for an additional hour to permit the pH to stabilize.

A $Li^+$ ion-exchanged intermediate product was recovered from the suspension by vacuum filtration. The intermediate product was dried and heat-treated in ambient air at about 380° C. for 8 hours to give the lithiated manganese dioxide product. Total lithium and manganese contents, relative oxygen stoichiometry, and specific surface area of the heat-treated product of Comparative Example 3 are given in Table 3.

The x-ray powder diffraction pattern of the heat-treated lithiated manganese dioxide product of Comparative Example 3 exhibited peaks characteristic of $\gamma$-$MnO_2$ and a relatively small amount of $\beta$-$MnO_2$ consistent with the x-ray pattern disclosed in FIG. 1 of the co-pending U.S. Application referenced hereinabove.

EXAMPLE 4

The discharge performance of lithium electrochemical cells having cathodes containing the heat-treated lithiated manganese dioxides of Examples 1–3, the heat-treated EMD of Comparative Example 1, the heat-treated CMD of Comparative Example 2, and the heat-treated lithiated manganese dioxide of Comparative Example 3 was evaluated in coin cells (e.g., Type CR 2430 available from Fuji Electrochemical Co., Ltd.) Overall dimensions of the coin cells (NEDA/ANSI designation 5011LC) used: 24.50 mm maximum diameter, 3.00 mm maximum height, and about 1.41 $cm^3$ nominal internal volume. The cathode was prepared by first pressing about 600 mg of a mixture containing 75 wt % graphite (e.g., available from TIMCAL America Inc. under the tradename "TIMREX KS 6") and 25 wt % polytetrafluorethylene (e.g., available from E.I. Dupont under the trade designation "T-60" PTFE dispersion) into a stainless steel grid welded to the bottom of the cell, followed by pressing a cathode mixture consisting of 60 wt % active cathode material, 35 wt % graphite, and 5 wt % PTFE binder containing a total of 100 mg of active cathode material on top of the graphite/PTFE underlayer. A circular microporous, non-woven polypropylene separator sheet, about 0.025 mm thick (e.g., available from Hoehst under the tradename "Celgard 2400") was placed on top of the cathode layer. A circular anode punched from about 0.8 mm thick lithium metal foil was placed on top of the separator sheet.

Sufficient electrolyte containing 0.6 M lithium trifluoromethanesulfonate (e.g., available from 3M under the trade designation "FC-122") dissolved in a mixture of dry DME/EC/PC in a volume percentage ratio of 70/10/20 was added to the cell and the cell sealed with a polypropylene seal by mechanical crimping. Coin cells typically were discharged at a constant current of 3.1 mA to a cutoff voltage of 1.5 volts. This corresponds to a nominal C/10 discharge rate (i.e., a rate at which the cell capacity is discharged in a period of 10 hours).

Figure 4:
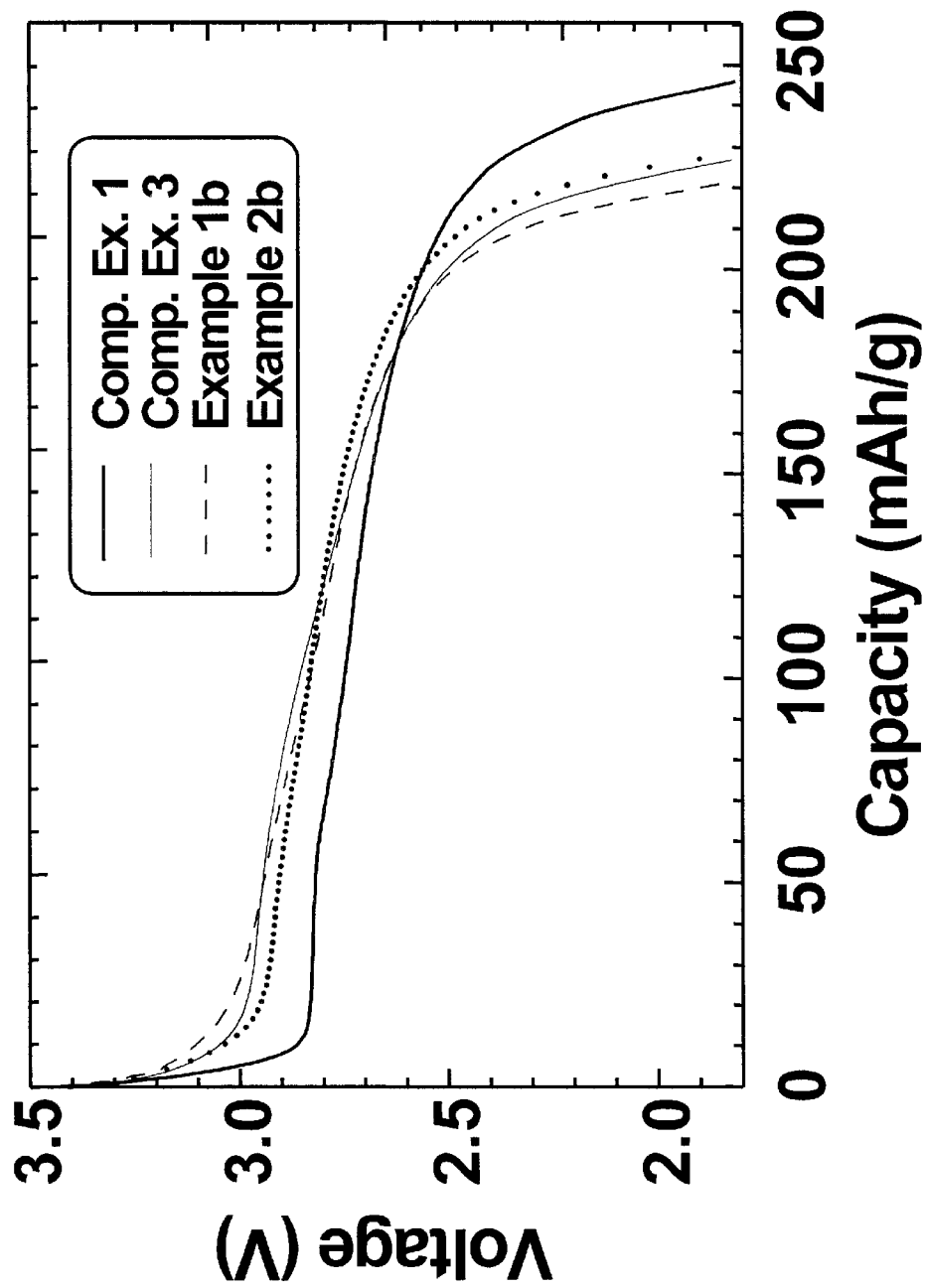
FIG. 4 is a graph depicting a comparison of the discharge performance of coin cells having cathodes containing heat-treated EMD and various lithiated manganese dioxides prepared by the method of this invention discharged at a C/10 rate.

Typical discharge curves for coin cells with cathodes containing the lithiated manganese dioxides of Example 1b and Example 2b both having a nominal composition of $Li_{0.12}MnO_2$ are compared with that for the heat-treated EMD of Comparative Example 1 in FIG. 4. The lithiated manganese dioxides give clearly superior discharge performance, having much higher initial and average operating voltages than the heat-treated EMD, although the discharge capacities are 8 to 10% less. Further, the performance of the lithiated manganese dioxides of Example 1b and Example 2b having a nominal composition of $Li_{0.12}MnO_2$ prepared by the method of this invention exhibit comparable performance to the lithiated manganese dioxide of Comparative Example 3 having the nominal composition $Li_{0.15}MnO_2$ prepared by the method of the co-pending U.S. Application referenced hereinabove.

Figure 5:
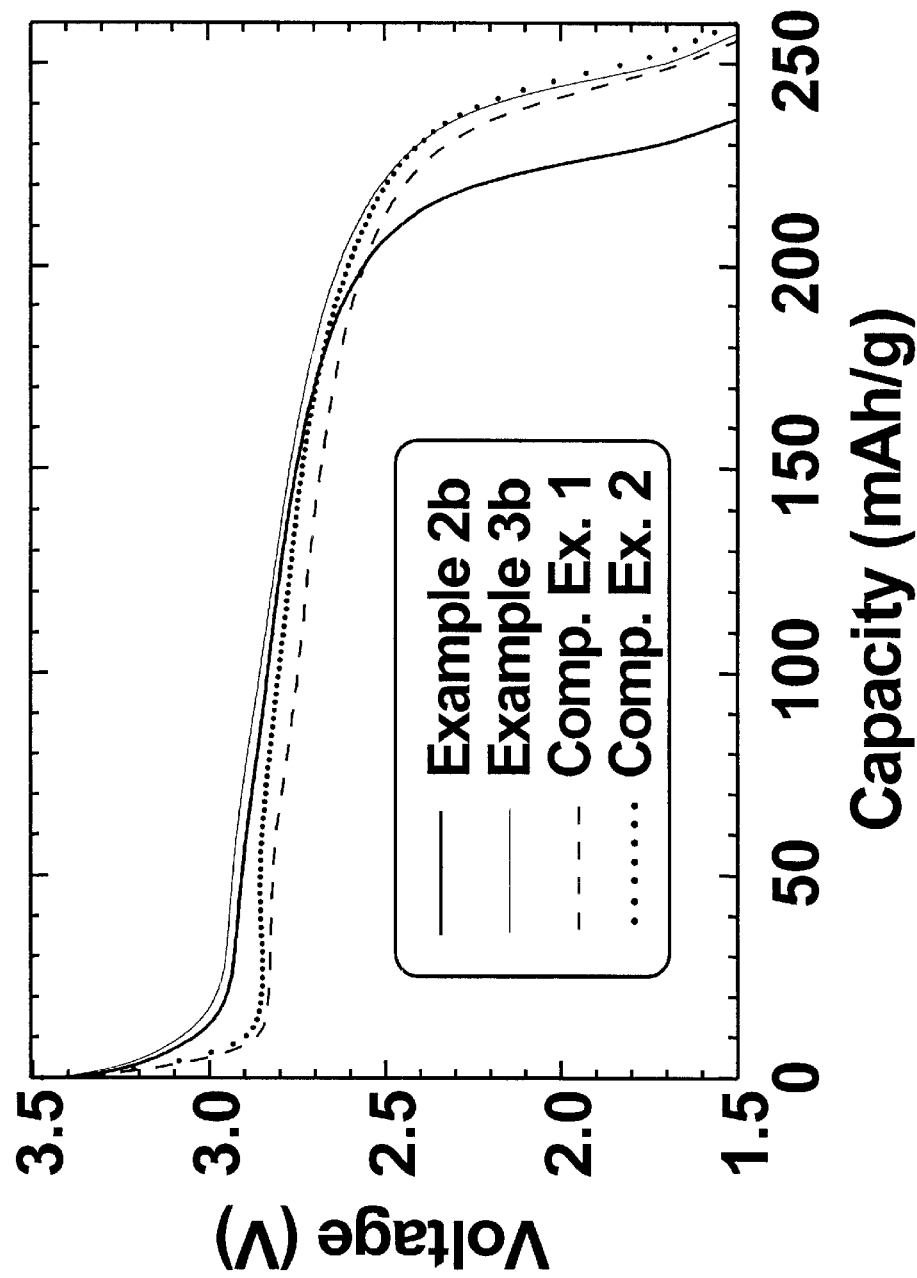
FIG. 5 is a graph depicting the discharge performance of coin cells having cathodes containing lithiated manganese dioxide prepared from a mixture of $Li_2CO_3$ and either EMD or CMD discharged at a C/10 rate.

Typical discharge curves for coin cells having cathodes containing the lithiated manganese dioxides of Example 2b and Example 3b both having a nominal composition of $Li_{0.12}MnO_2$ are compared in FIG. 5 with that for the heat-treated CMD of Comparative Example 2. The lithiated manganese dioxides both give clearly superior discharge performance, having much higher initial and operating voltages than the heat-treated CMD of Comparative Example 2. Further, the discharge capacity of the lithiated manganese dioxide of Example 3b is comparable to that of the heat-treated CMD of Comparative Example 2. However, the discharge capacity of the lithiated manganese dioxide of Example 2b is about 5% less than that of Comparative Examples 1 and 2.

Figure 6:
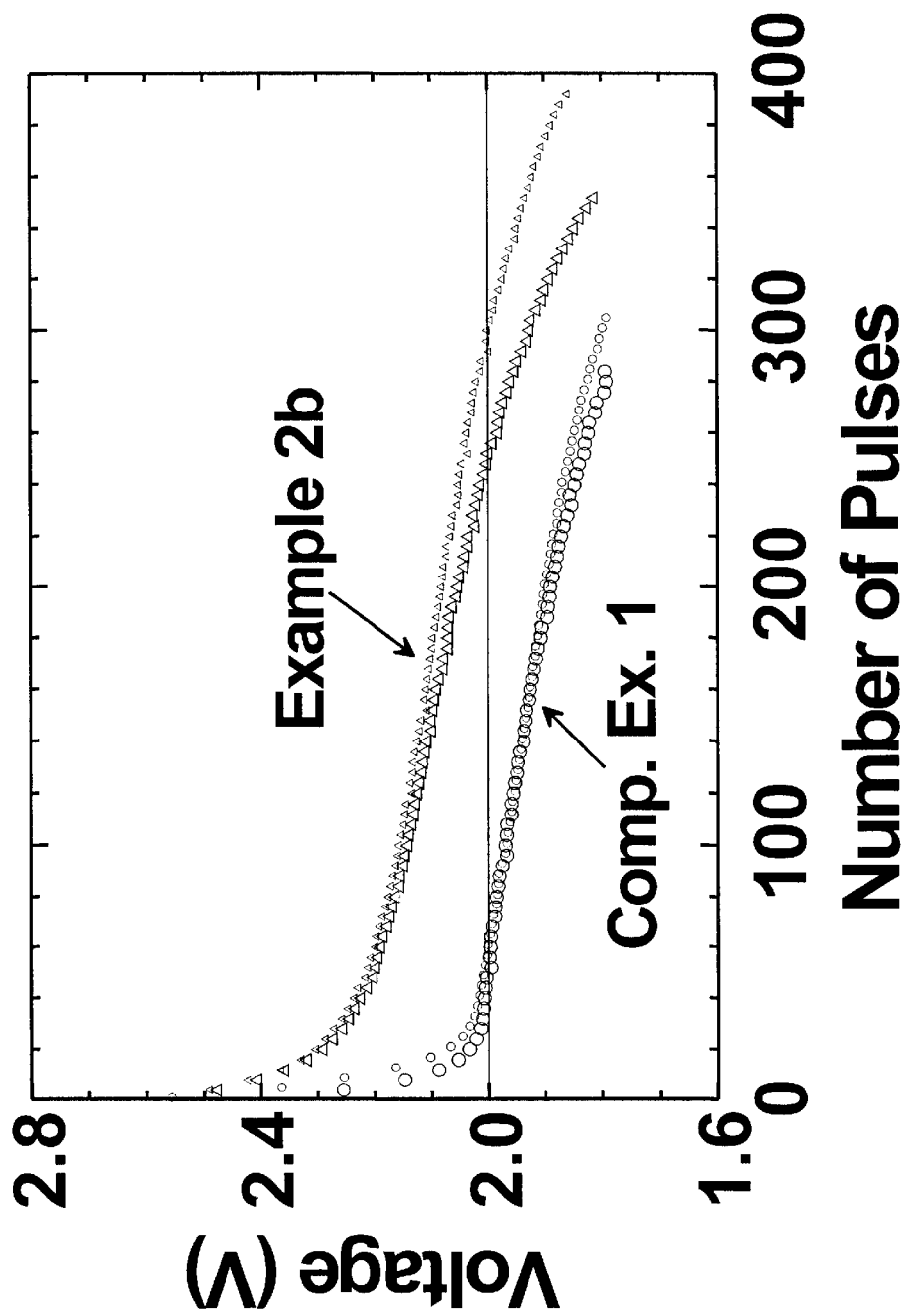
FIG. 6 is a graph depicting the high current pulse discharge performance at −10° C. of coin cells having cathodes containing lithiated manganese dioxide with the nominal composition $Li0.12MnO_2$ prepared from EMD and $Li_2CO_3$.

High current pulse discharge performance of lithiated manganese dioxide prepared by the method of this invention at both room temperature and low temperature is dramatically superior to that of heat-treated EMD of Comparative Example 1. Coin cells including cathodes containing the lithiated manganese dioxide of Example 2b having a nominal composition of $Li_{0.12}MnO_2$ provided nearly an order of magnitude more high current pulses when tested at −10° C. using a 3 second on and 7 second off duty cycle at a C/1 rate to a 2 V cutoff voltage. Such a test is indicative of the flash re-cycle time performance for such cells in high performance compact photographic cameras. The low temperature high current pulse discharge performance of cells containing the lithiated manganese dioxide of Example 2b shown in FIG. 6 is excellent.

Although the present invention has been described with respect to specific embodiments, it should be recognized that variations are possible without departing from the concept of the invention. Thus, the invention is not intended to be limited to specific embodiments, but rather its scope is reflected by the claims and equivalents thereof.

What is claimed is:
1. A process for treating manganese dioxide comprising the steps of:
   (a) forming a mixture comprising milling media and a reaction mixture, said reaction mixture comprising manganese dioxide and a lithium salt, wherein the weight ratio of said reaction mixture to said milling media is between about 1:3 to 1:40;
   (b) mechanically activating said reaction mixture with said milling media therein at ambient temperature to form a lithiated manganese dioxide intermediate product having the formula $Li_xMnO_2$, wherein $0.05 \leq x \leq 0.125$.
2. The process of claim 1 further comprising the steps of:
   (c) heat-treating said lithiated manganese dioxide intermediate product to form a heat-treated lithiated manganese dioxide product having the formula $Li_yMnO_{2-\delta}$, wherein $0.05 \leq y \leq 0.175$ and $0.01 \leq \delta \leq 0.06$, and having a predominantly $\gamma$-$MnO_2$-type crystal structure.
3. The process of claim 2 wherein the heat-treating of said lithiated manganese dioxide intermediate product is carried out at a temperature between 350 and 420° C.
4. The process of claim 1 wherein said mechanical activation is accomplished by agitating said reaction mixture with said milling media.
5. The process of claim 1 wherein said lithium salt is selected from the group consisting of lithium oxide, lithium hydroxide, lithium hydroxide monohydrate, lithium carbonate, lithium nitrate, lithium nitrate hemihydrate, lithium oxalate, lithium methoxide, and lithium peroxide, and mixtures thereof.
6. The process of claim 1 wherein said milling media comprise rigid chemically inert particles which do not react with said reaction mixture comprising manganese dioxide and a lithium salt during said mechanical activation step.
7. A process for treating manganese dioxide comprising the steps of:
   (a) forming a mixture comprising rigid particulate milling media and an essentially dry reaction mixture, said reaction mixture comprising manganese dioxide and a lithium salt, wherein the weight ratio of said reaction mixture to said milling media is between about 1:3 to 1:40;
   (b) mechanically activating said reaction mixture with said milling media therein at ambient temperature to form a lithiated manganese dioxide intermediate product having the formula $Li_xMnO_2$, wherein $0.05 \leq x \leq 0.125$; and
   (c) heat-treating said lithiated manganese dioxide intermediate product at a temperature between 350 and 420° C. to form a heat-treated lithiated manganese dioxide product having the formula $Li_yMnO_{2-\delta}$, wherein $0.05 \leq y \leq 0.175$ and $0.01 \leq \delta \leq 0.06$, and having a predominantly $\gamma$-$MnO_2$-type crystal structure.
8. The process of claim 7 wherein said mechanical activation is accomplished by agitating said reaction mixture with said milling media.
9. The process of claim 7 wherein said manganese dioxide is an electrolytic manganese dioxide (EMD) having a gamma($\gamma$)$MnO_2$-type crystal structure.
10. The process of claim 7 wherein said manganese dioxide is a chemical manganese dioxide (CMD) having a gamma($\gamma$)$MnO_2$-type crystal structure.
11. The process of claim 7 wherein said manganese dioxide has a sodium content less than 500 ppm.
12. The process of claim 7 wherein said manganese dioxide has a mean particle size between 10 and 60 microns.

13. The process of claim 7 further comprising the step (b.1) of separating said lithiated manganese dioxide intermediate product from said milling media before heat-treating said intermediate product in step (c).

14. The process of claim 7 wherein said lithium salt is selected from the group consisting of lithium oxide, lithium hydroxide, lithium hydroxide monohydrate, lithium carbonate, lithium nitrate, lithium nitrate hemihydrate, lithium oxalate, lithium methoxide, and lithium peroxide, and mixtures thereof.

15. The process of claim 7 wherein said reaction mixture comprises manganese dioxide and lithium salt having a Li/Mn atom ratio of from 0.05 to 0.18.

16. The process of claim 7 wherein said milling media is chemically inert in that it does not react with said reaction mixture comprising manganese dioxide and a lithium salt during said mechanical activation step.

17. The process of claim 7 wherein said milling media is selected from the group consisting of ceramic, glass, metal, and polymeric materials.

18. The process of claim 7 wherein said milling media comprises particles in the shape of beads, spheres, cylinders, rods or radius-end cylinders having a mean diameter between 0.2 and 5 mm.

19. The process of claim 7 wherein said milling media has a density ranging from about 3 to 15 g/cm$^3$.

20. The process of claim 7 wherein said weight ratio of said reaction mixture to said milling media is between 1:4 and 1:10.

21. The process of claim 7 wherein said milling media comprises a ceramic selected from the group consisting of steatite, aluminum oxide, zirconium oxide, zirconia-silica, yttria-stabilized zirconium oxide, magnesia-stabilized zirconium oxide, silicon nitride, silicon carbide, and cobalt-stabilized tungsten carbide.

22. The process of claim 7 wherein said reaction mixture is mechanically activated in step (b) by contacting said reaction mixture and said milling media therein with a mechanical apparatus selected from the group consisting of high energy ball mill, planetary mill, stirred ball mill, vibrating ball mill, multi-axial shaker/mixer, and any combination thereof.

23. The process of claim 7 wherein said mechanical activation in step (b) is conducted for a period of time of from about 0.25 to 8 hours.

24. The process of claim 7 wherein said mechanical activation in step (b) is conducted for a period of time of from about 0.5 to 6 hours.

25. The process of claim 7 wherein said heat-treating of said lithiated manganese dioxide intermediate product is for a period of between 4 to 12 hours.

26. The process of claim 7 wherein said heat-treating of said lithiated manganese dioxide intermediate product is accomplished in an oxidizing atmosphere.

27. The process of claim 26 wherein said oxidizing atmosphere comprises air or oxygen.

28. The process of claim 7 wherein said heat-treated lithiated manganese dioxide product has a total lithium content between 0.5 and 1.5 percent lithium by weight.

29. The process of claim 7 wherein said heat-treated lithiated manganese dioxide product has a total lithium content between 0.75 and 1.25 percent lithium by weight.

30. The process of claim 7 wherein said heat-treated lithiated manganese dioxide product does not comprise a lithium manganese oxide having a spinel-type crystal structure.

31. A primary lithium electrochemical cell comprising a case; positive and negative terminals; an anode comprising lithium metal or a lithium alloy; a nonaqueous electrolyte; and a cathode comprising a heat-treated lithiated manganese dioxide, the improvement comprising said heat-treated lithiated manganese dioxide made by the process of:
(a) forming a mixture comprising milling media and an essentially dry reaction mixture, said reaction mixture comprising manganese dioxide and a lithium salt, wherein the weight ratio of said reaction mixture to milling media is between about 1:3 to 1:40;
(b) mechanically activating said reaction mixture with said milling media therein at ambient temperature to form a lithiated manganese dioxide intermediate product having the formula $Li_xMnO_2$, wherein $0.05 \leq x \leq 0.125$; and
(c) heat-treating said lithiated manganese dioxide intermediate product at a temperature between 350 and 420° C. to form a heat-treated lithiated manganese dioxide product having the formula $Li_yMnO_{2-\delta}$, wherein $0.05 \leq y \leq 0.175$ and $0.01 \leq \delta \leq 0.06$, and having a predominantly $\gamma$-$MnO_2$-type crystal structure.

32. The primary lithium electrochemical cell of claim 31 wherein said mechanical activation is accomplished by agitating said reaction mixture with said milling media.

33. The primary lithium electrochemical cell of claim 31 wherein said manganese dioxide is an electrolytic manganese dioxide (EMD) having a gamma($\gamma$)$MnO_2$-type crystal structure.

34. The primary lithium electrochemical cell of claim 31 wherein said manganese dioxide is a chemical manganese dioxide (CMD) having a gamma($\gamma$)$MnO_2$type crystal structure.

35. The primary lithium electrochemical cell of claim 31 wherein said manganese dioxide has a mean particle size between 10 and 60 microns.

36. The primary lithium electrochemical cell of claim 31 wherein said lithium salt is selected from the group consisting of lithium oxide, lithium hydroxide, lithium carbonate, lithium nitrate, lithium oxalate, lithium methoxide, and lithium peroxide, and mixtures thereof.

37. The primary lithium electrochemical cell of claim 31 wherein said reaction mixture comprises manganese dioxide and lithium salt having a Li/Mn mole ratio of from 0.05 to 0.18.

38. The process of claim 31 further comprising the step (b.1) of separating said lithiated manganese dioxide intermediate product from said milling media before heat-treating said intermediate product in step (c).

39. The process of claim 31 wherein said milling media is chemically inert in that it does not react with said reaction mixture comprising manganese dioxide and lithium salt during said mechanical activation step.

40. The process of claim 31 wherein said milling media is selected from the group consisting of ceramic, glass, metal, and polymeric materials.

41. The primary lithium electrochemical cell of claim 31 wherein said milling media comprises particles in the shape of beads, spheres, cylinders or radius-end cylinders having a mean diameter between 0.2 and 5 mm.

42. The primary lithium electrochemical cell of claim 31 wherein said milling media comprises yttria-stabilized zirconium oxide spheres.

43. The primary lithium electrochemical cell of claim 31 wherein said mechanical activation in step (b) is accomplished by contacting said reaction mixture and said milling media therein with a mechanical apparatus selected from the group consisting of high energy ball mill, planetary mill, stirred ball mill, vibrating ball mill, multi-axial shaker/mixer, and any combination thereof.

44. The primary lithium electrochemical cell of claim 31 wherein said mechanical activation in step (b) is conducted for a period of time of from about 0.5 to 6 hours.

45. The primary lithium electrochemical cell of claim 31 wherein said heat-treating of said lithiated manganese dioxide intermediate product is for a period of between 4 to 12 hours.

46. The primary lithium electrochemical cell of claim 31 wherein said heat-treating of said lithiated manganese dioxide intermediate product is accomplished in an oxidizing atmosphere.

47. The primary lithium electrochemical cell of claim 31 wherein said heat-treated lithiated manganese dioxide product has a total lithium content between 0.5 and 1.5 percent lithium by weight.

48. The primary lithium electrochemical cell of claim 31 wherein said heat-treated lithiated manganese dioxide product has a total lithium content between 0.75 and 1.25 percent lithium by weight.

49. The primary lithium electrochemical cell of claim 31 wherein said heat-treated lithiated manganese dioxide product does not comprise a lithium manganese oxide having a spinel-type crystal structure.

* * * * *